(12) United States Patent  
Barnett, Jr. et al.

(10) Patent No.: US 7,415,312 B2  
(45) Date of Patent: Aug. 19, 2008

(54) PROCESS MODULE TUNING

(76) Inventors: James R. Barnett, Jr., 7603 Parkview Cir., Austin, TX (US) 78731; Mark K. Ekblad, 1452 Marcia Ave., San Jose, CA (US) 95125; Jeffrey M. Parker, 2605 Chitina Ct., Cedar Park, TX (US) 78613

( * ) Notice: Subject to any disclaimer, the term of this patent is extended or adjusted under 35 U.S.C. 154(b) by 368 days.

(21) Appl. No.: 10/855,696

(22) Filed: May 26, 2004

(65) Prior Publication Data

US 2005/0267606 A1 Dec. 1, 2005

(51) Int. Cl.
- *G05B 13/02* (2006.01)
- *G06F 19/00* (2006.01)
- *F27B 5/14* (2006.01)
- *H05B 3/68* (2006.01)
- *F27D 11/00* (2006.01)
- *A21B 1/22* (2006.01)
- *A21B 1/00* (2006.01)

(52) U.S. Cl. .......................... 700/29; 700/28; 700/121; 700/207; 219/390; 219/444.1; 219/443.1; 219/402; 219/405; 324/754; 324/713; 324/465; 324/511

(58) Field of Classification Search .................. 700/29, 700/44; 73/866.1; 702/94, 127; 219/390
See application file for complete search history.

(56) References Cited

U.S. PATENT DOCUMENTS

| | | | |
|---|---|---|---|
| RE32,369 E | 3/1987 | Stockton et al. | |
| 5,252,435 A | 10/1993 | Tani et al. | |
| 5,262,944 A | 11/1993 | Weisner et al. | |
| 5,435,646 A | 7/1995 | McArthur et al. | |
| 5,444,637 A * | 8/1995 | Smesny et al. | 702/127 |
| 5,516,608 A | 5/1996 | Hobbs et al. | |
| 5,519,605 A | 5/1996 | Cawlfield | |
| 5,564,889 A | 10/1996 | Araki | |
| 5,920,478 A * | 7/1999 | Ekblad et al. | 700/29 |
| 5,969,639 A | 10/1999 | Lauf et al. | |
| 5,970,313 A | 10/1999 | Rowland et al. | |

(Continued)

FOREIGN PATENT DOCUMENTS

EP 1014437 A2 6/2000

(Continued)

OTHER PUBLICATIONS

European Patent Office, International Searching Authority, "Notification of Transmittal of the International Search Report and the Written Opinion", issued in corresponding PCT Application No. PCT/US2005/017771, Sep. 28, 2005, 15 pages.

(Continued)

*Primary Examiner*—Albert DeCady  
*Assistant Examiner*—Sunray R Chang  
(74) *Attorney, Agent, or Firm*—Joshua D. Isenberg; JDI Patent (57) ABSTRACT

A process module tuning method characterizes a process module by gathering data using a process condition measuring device to measure process outputs while inputs are excited. The data is used to identify a dynamic process model. The dynamic process model is then be used to determine process input settings that will produce desired outputs. For multi-zone process modules, the interactions between zones may be modeled.

25 Claims, 7 Drawing Sheets

U.S. PATENT DOCUMENTS

| | | | |
|---|---|---|---|
| 6,010,538 | A | 1/2000 | Sun et al. |
| 6,033,922 | A | 3/2000 | Rowland et al. |
| 6,075,909 | A | 6/2000 | Ressl |
| 6,100,506 | A | 8/2000 | Colelli, Jr. et al. |
| 6,190,040 | B1 | 2/2001 | Renken et al. |
| 6,191,394 | B1* | 2/2001 | Shirakawa et al. ....... 219/444.1 |
| 6,222,161 | B1* | 4/2001 | Shirakawa et al. .......... 219/390 |
| 6,229,116 | B1 | 5/2001 | Shirakawa et al. |
| 6,235,439 | B1 | 5/2001 | Whiting |
| 6,313,903 | B1 | 11/2001 | Ogata |
| 6,325,536 | B1 | 12/2001 | Renken et al. |
| 6,373,033 | B1 | 4/2002 | de Waard et al. |
| 6,377,130 | B1 | 4/2002 | Haman |
| 6,378,378 | B1 | 4/2002 | Fisher |
| 6,445,963 | B1* | 9/2002 | Blevins et al. ................. 700/44 |
| 6,461,438 | B1* | 10/2002 | Ookura et al. .............. 118/724 |
| 6,472,240 | B2 | 10/2002 | Akram et al. |
| 6,542,835 | B2 | 4/2003 | Mundt |
| 6,553,277 | B1 | 4/2003 | Yagisawa et al. |
| 6,617,553 | B2 | 9/2003 | Ho et al. |
| 6,691,068 | B1* | 2/2004 | Freed et al. ................. 702/187 |
| 6,753,508 | B2* | 6/2004 | Shirakawa ............... 219/444.1 |
| 6,889,568 | B2* | 5/2005 | Renken ...................... 73/866.1 |
| 6,901,300 | B2 | 5/2005 | Blevins et al. |
| 7,089,075 | B2* | 8/2006 | Hasan ......................... 700/121 |
| 2001/0014520 | A1 | 8/2001 | Usui et al. |
| 2002/0078770 | A1 | 6/2002 | Hunter |
| 2002/0109590 | A1 | 8/2002 | Parsons |
| 2002/0148307 | A1 | 10/2002 | Jonkers |
| 2002/0161557 | A1 | 10/2002 | Freed |
| 2002/0172097 | A1 | 11/2002 | Freed |
| 2002/0177916 | A1 | 11/2002 | Poolla |
| 2002/0177917 | A1 | 11/2002 | Poolla |
| 2002/0193957 | A1 | 12/2002 | Freed |
| 2004/0031340 | A1 | 2/2004 | Renken |
| 2004/0098145 | A1 | 5/2004 | Liu et al. |
| 2004/0106073 | A1* | 6/2004 | Yoshino ...................... 430/330 |
| 2004/0107066 | A1 | 6/2004 | Poolla et al. |
| 2004/0131226 | A1 | 7/2004 | Poolla |
| 2004/0154417 | A1* | 8/2004 | Renken et al. ............. 73/866.1 |
| 2004/0195229 | A1* | 10/2004 | Szekeresch et al. ......... 219/390 |
| 2004/0225462 | A1* | 11/2004 | Renken et al. ................. 702/94 |
| 2004/0249604 | A1 | 12/2004 | Poolla et al. |
| 2004/0267501 | A1 | 12/2004 | Freed |
| 2005/0267606 | A1* | 12/2005 | Bartlett et al. ................. 700/29 |

FOREIGN PATENT DOCUMENTS

| | | |
|---|---|---|
| WO | WO 00/68986 | 11/2000 |
| WO | WO 02/17030 A3 | 2/2002 |
| WO | WO 03/067183 A2 | 8/2003 |

OTHER PUBLICATIONS

U.S. Appl. No. 60/285,613, filed Apr. 19, 2001; Freed et al.; "Firmware, Methods, Apparatus, and Computer Program Products for Wafer Sensors".

U.S. Appl. No. 60/285,439, filed Apr. 19, 2001; Freed et al.; "Methods Apparatus, and Computer Program Products for Obtaining Data for Process Operation, Optimization, Monitoring, and Control".

Freed et al.; "Autonomous On-Wafer Sensors for Process Modeling, Diagnosis, and Control," IEEE Transactions on Semiconductor Manufacturing, vol. 14, No. 3, Aug. 2001, pp. 255-264.

Freed; "Wafer-Mounted Sensor Arrays for Plasma Etch Processes," Dissertation, Univ. of CA. Berkeley, Fall 2001.

Techleaf: "Multizone Control Challenges and Solutions," Oakleaf Engineering, Inc. Redwood City, CA. 1999.

Baker et al.; "A Novel In Situ Monitoring Technique for Reactive Ion Etching Using a Surface Micromachined Sensor," IEEE Transactions on Semiconductor Manufacturing, vol. 11, No. 2, May 1998, pp. 254-264.

SensArray "Accura° C Metrology System," 2003 SensArray Corporation, Fremont, CA.

"Beyond PID Controller, Transforming Control Science into Control Practice," Oakleaf Engineering, Inc. Redwood City, CA; 1999, 2000.

* cited by examiner

PROCESS MODULE TUNING

BACKGROUND

This application relates to substrate processing equipment used for substrates such as semiconductor wafers. In particular, this application addresses tuning of process modules used to process such substrates.

A process module is used to carry out a particular process step, or series of steps, on a substrate during manufacture of products including integrated circuits and flat-panel displays. Examples of process modules used in the semiconductor industry include etch chambers, rapid thermal processing chambers, chemical vapor deposition chambers, physical vapor deposition chambers, furnaces, chemical mechanical polishing systems and hotplates. These process modules process silicon wafers of various sizes including 200 millimeter and 300 millimeter wafers. Gallium Arsenide and other semiconductor substrates may also be processed. Similar process modules are used to process other substrates including flat panel displays.

Figure 1:
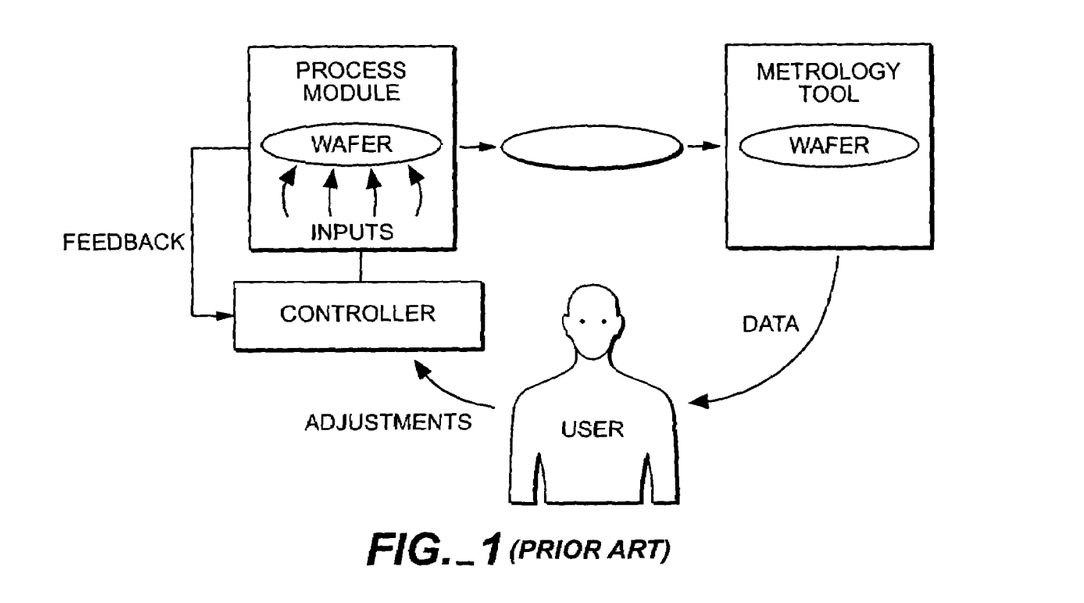
FIG. 1 shows prior art process module tuning.

Process modules may be tuned by processing test substrates with differing process inputs and analyzing the results on the test substrates. This provides a form of feedback shown in FIG. 1. A wafer is first processed and then the results of processing are measured in a metrology tool and the process module is adjusted according to the data obtained. However, this method of tuning is expensive and time-consuming. Many test substrates may be needed and additional metrology equipment is necessary to make measurements. Some process modules may not be easily tuned in this way because some of the process conditions may affect the process in ways that are not easily measurable, or are only measurable after more process steps are performed. For example, the effect of a hotplate used for post exposure bake of a photoresist layer on a substrate may be discernable only after the substrate has been processed further and the photoresist layer has been developed. This method gives only indirect information on the process conditions in the process module. Temperature in the process module may be inferred from characteristics of the resulting layer but this may not be accurate because of other factors that affect the same characteristics. Thus, using indirect information from test substrates is of limited value.

Figure 2:
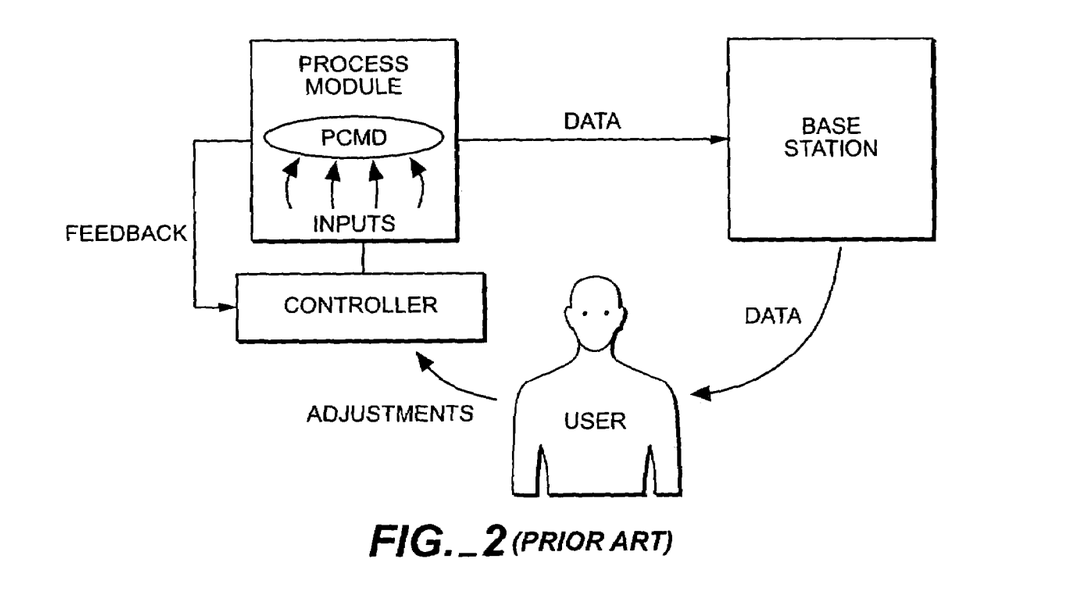
FIG. 2 shows prior art process module tuning.

Another method of tuning a process module is shown in FIG. 2. This shows a process condition measuring device placed in the process module providing data to a base station. A process condition measuring device (PCMD) may be made to resemble the substrates that are normally handled by the process module. Thus, for use in a process module configured for 300 millimeter wafers, a PCMD might resemble a 300 millimeter wafer. A PCMD has sensors on its surface or within cavities so that process conditions may be measured. These measurements approximate the actual process conditions experienced by a regular substrate during production. A PCMD may transmit data through a cable to a base station, or transmission may be wireless. A cable may affect heat flow and other characteristics of the substrate. Wireless transmission does not require a cable and therefore the PCMD may be made to more closely resemble a regular substrate. Transmission of data may be in real-time or at any time after data is collected. Data may be stored in a memory and later retrieved when the PCMD is outside the process module. This may be more practical for process modules that have many potential sources of electromagnetic interference such as RF power supplies and microwave generators. With a PCMD, one or more process condition may be directly measured instead of being inferred from process results. For example, to tune the temperature in a process module, temperature is directly measured by a PCMD. Examples of PCMDs are provided in U.S. Pat. Nos. 6,190,040 and 6,325,536, which patents are hereby incorporated in their entirety.

Modern process modules may be complex, having many process conditions that affect the quality of the substrate that is processed. Process conditions such as temperature, pressure, gas flow rate, chemical concentration, plasma density, etch rate and deposition rate may be affected by process inputs including the power provided to heating units, temperature setpoint, pumping speed, pressure setpoint, geometry of the module, substrate position, gas flow provided, radio-frequency power etc. The interactions of these process inputs to provide the process conditions may be complex and difficult to tune to obtain a desired result.

In addition, a particular process condition such as temperature or etch rate may vary across a substrate. Thus, one portion of the substrate may have a process condition at a desired level while other portions of the same substrate do not have the process condition at the desired level. Typically, for a process to be tuned, a wafer must have process conditions within a desired range across a primary surface. For a 300 millimeter wafer, process conditions may need to be substantially uniform across the surface in order to produce integrated circuits of adequate quality. Typically, a portion of the primary surface, close to the edge of the wafer does not need to be within the desired range because this portion is not used.

Feedback controllers such as Proportional, plus Integral, plus Derivative (PID) controllers are widely used to maintain a process condition in a process module within a specified process window. A PID controller provides a modified process input to the process in response to a difference between a measured process output and a desired process output (or error). The equation used by a PID controller is given by:

$$CO = K_p \cdot E + K_i \int E \, dt + K_d \cdot dE/dt \qquad \text{(Eqn. 1)}$$

where CO is the controller output, or the process input that is controlled. The equation has three terms, a proportional term, an integral, term and a derivative term. The proportional term ($K_p \times E$) is proportional to the error E. A proportional constant, or gain ($K_p$), determines how great a response is produced by a particular value of E. Thus, a high gain produces a greater response for a given difference. An integral term ($K_i \int E \cdot dt$) produces a long-term corrective change by integrating the error E over time. A constant called $K_i$ determines the magnitude of the correction. A derivative term ($K_d \times dE/Dt$) produces a response that depends on the rate of change in the error. This term is proportional to a constant $K_d$. Other controllers do not have a derivative response and so are PI controllers. Other feedback controllers using different equations are also used. Controllers may also operate without feedback such as by maintaining a fixed output.

Tuning controlled systems may require adjusting one or more setpoints. Sometimes, an offset feature is present that allows a setpoint for a controlled system to be offset by a particular amount. Tuning a simple controlled system may be a matter of setting an offset to the right value. Tuning a controlled system to achieve a desired dynamic behavior may require changing other operating parameters such as PID constants to ensure that the process input responds rapidly enough, but avoids overshoot or oscillation. Maximum and minimum power settings are other operating parameters that may be used to regulate the response of the controller. Setting maximum and minimum power levels keeps the output in a limited range and thus prevents large oscillations or overshoot.

To tune a process module for a particular process condition it is generally necessary to make several adjustments to process inputs of the process module and note the effect on a process condition. For example, tuning a multi-zone hotplate may require making adjustments to the heat supplied to several of the zones. Where a PCMD is present in the process module, it may be possible to monitor the effect of such adjustments in real-time. However, tuning is generally directed to achieving temperature uniformity in a steady-state condition. Therefore, when an adjustment is made, it may be necessary to wait for the system to reach a new equilibrium before the next adjustment is made. Depending on the number of adjustments needed, this may be quite time-consuming. Each adjustment may affect more than one process output. Adjusting the heat supplied to a heating zone affects the temperature not only in that zone, but in neighboring zones also because heat is conducted to the other zones. Therefore, as each zone is tuned in turn, neighboring zones that may already have been tuned may be affected so that they are no longer tuned.

In some facilities, multiple process modules may operate in parallel to perform the same function. For example, two process modules might do the same etch step, with half the wafers going to one module and half to the other. It is important that there are no significant differences between the substrates from the modules so that all devices from all substrates have similar characteristics. Tuning may be necessary to match such process modules and achieve module-to-module uniformity. For example, hotplates may be tuned so that different hotplates have the same temperature profile. This is in addition to tuning individual hotplates to have a particular temperature profile across the hotplate. Typically, the goal is to produce the same conditions at all points of all substrates.

Trends in technology make tuning of process modules more important. Substrates are generally increasing in size. For example, the semiconductor industry moved from 150 millimeter to 200 millimeter wafers and is now moving to 300 millimeter wafers. Flat-panel display substrates may have dimensions in excess of 2 meters. Uniformity becomes harder to maintain over such large substrates. As substrates have increased in size, the dimensions of the features on those substrates have decreased in size. These small features sometimes require process conditions to be controlled within very narrow windows. For example, chemically amplified photoresist is extremely sensitive to the temperature of the post exposure bake step. Variations of less than 1 degree Centigrade may affect the Critical Dimension (CD) of the photoresist pattern. In addition, such processes may be sensitive to transient conditions as well as steady-state conditions.

Therefore, there is a need for a method of tuning a multi-input, multi-output process module to provide control of process conditions within narrow process windows. Furthermore, there is a need for a method of tuning that is rapid and may be implemented on existing process modules with little disruption to the module.

SUMMARY

A model-based method of tuning a process module is disclosed. A model-based approach is capable of giving improved tuning because complex interactions between multiple inputs affecting multiple outputs may be characterized and used to accurately predict input values that will produce a desired output.

A process module that has multiple inputs and multiple outputs may be characterized by recording data while individual inputs are excited. The recorded data are then used to build a software model that includes relationships between inputs and outputs including the effects of multiple inputs on a single output. The model may be used to predict inputs that will provide a set of desired outputs thus tuning the process module.

A multi-zone hotplate may be characterized by collecting data on the performance of the hotplate and using the data to develop a dynamic process model of the inputs and outputs of the hotplate. Data may be collected while placing a PCMD on the hotplate and providing some excitation to the hotplate. This excitation may be non-uniform so that different zones experience different conditions. Data are gathered from the PCMD and may also be collected from the process module or the controller during excitation. A curve is fitted to the data to provide a dynamic process model of the output of the hotplate (temperature) at a particular time as a function of previous temperatures and process inputs (powers). A steady-state gain is determined from this model. The steady-state gain is a matrix that includes terms relating each input to each output that is modeled. Thus, zone temperature is modeled with respect to power to all modeled zones, not just an individual zone. The steady-state gain matrix may be used to predict the substrate temperatures that would be produced by a set of input powers. The steady-state gain matrix may be inverted to provide an inverted gain matrix that may predict inputs from a set of outputs. Desired outputs may be inserted and the inverted gain matrix provides the input values that would provide these outputs. Thus, model-based tuning operates as a form of feedback that is used to tune the process module. Certain process outputs may be ignored when developing a process model. For example, where a sensor provides incorrect data, the measurement from the sensor may be ignored. Instead, the value measured by the sensor may be fixed at a chosen value, or allowed to float at a value of a neighboring sensor (or an average of two or more neighboring sensors), for purposes of model building.

A modeling system may be directly connected to a controller to allow direct acquisition of controller data. The data from the controller, data from a PCMD and any other useful data are used to develop the model. Certain recorded data may be ignored in developing the model. Data from certain zones may be left out of modeling if specified by a user or if the software detects that the zone data are not helpful in developing the model.

Model-based tuning may be combined with fine-tuning using a "reconcile" procedure. This procedure makes minor adjustments to individual inputs based on data gathered during a routine that is identical or similar to a standard process recipe. The reconcile procedure is generally performed after the process module has been tuned using full model-based tuning so that any adjustment is minor. For example, a multi-zone hotplate may be tuned to provide uniform substrate temperature by building a model and adjusting operating parameters such as setpoints according to the predictions of the model. Then, a reconcile procedure may be performed to bring substrate temperature of some of the zones closer to the desired temperature for a particular set of conditions. The reconcile procedure may be repeated on a periodic basis to correct for small changes in process module performance.

In addition to the model-based tuning and reconcile procedure, periodic "auditing" of a process module may be used to detect changes in process module performance. An audit is performed when a PCMD is used to record process condition data from a process module that is compared with historic data or target data values to determine if the process module is operating satisfactorily.

DETAILED DESCRIPTION

Figure 3A:
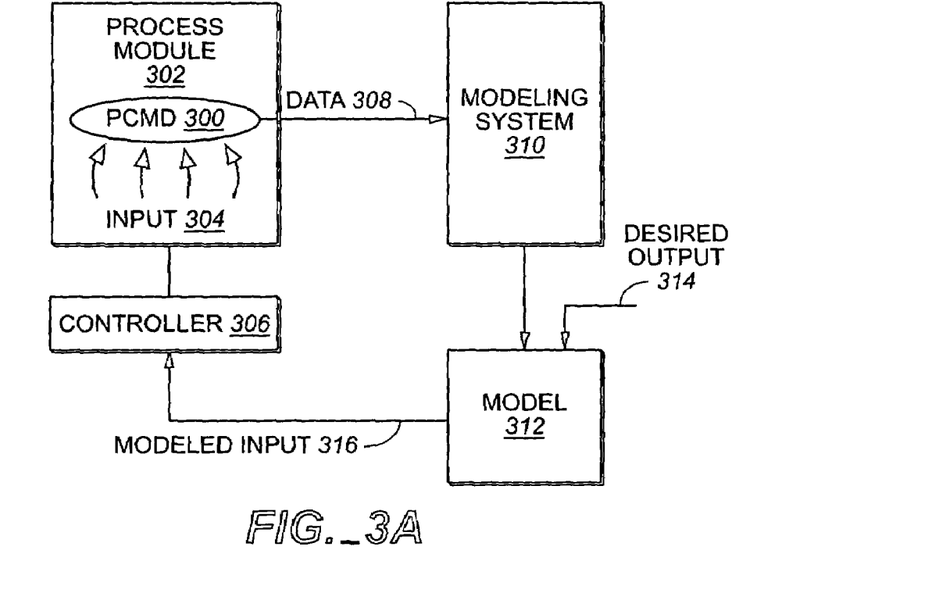
FIG. 3A shows a model-based process module tuning system according to an embodiment of the present invention.

FIG. 3A shows process tuning according to one embodiment of the present invention. A PCMD 300 is placed in a process module 302 where it is subjected to process inputs 304 that are controlled by a controller 306. The PCMD 300 provides process condition data 308 to a modeling system 310. The modeling system 310 creates a model 312 of the relationships between process inputs 304 and the process conditions measured by the PCMD 300. A desired output 314 such as a set of process condition values may be entered into the model 312 and the model 312 then predicts the modeled input 316 that will provide the desired output 314. Process input 316 is then used to adjust the controller 306 so that the desired output 314 is achieved.

The process module 302 may be a substrate-processing module such as those used to process semiconductor wafers, flat-panel displays or other substrates. Examples of process modules that may be tuned using aspects of this invention include modules used to etch substrates, deposit layers on substrates, heat substrates, add dopants to substrates or to form patterns on substrates. Typically, a substrate in such a module goes through one or more process steps during which it is subject to certain conditions that are controlled by a controller.

The controller 306 may be any controller that is capable of modifying a process input to maintain a target condition. A controller may simply provide an input to a module at some predetermined level without feedback from the module. For example, power may be set to a particular level that is expected to produce a desired temperature. However, typically a controller responds to some feedback from the process module in order to control a process condition within some target window. For example, pressure may be adjusted by a controller by opening and closing a pressure control valve in response to a pressure measurement. Temperature may be adjusted by increasing or decreasing the amount of heat generated by a heating unit in response to a temperature measurement. A controller, or multiple controllers may control more than one process condition at a time. For example, temperature and pressure may both be controlled. In addition, a controller (or controllers) may control the same process condition at different points within the process module. For example, it may be desirable to control temperature separately at various points to improve temperature uniformity. Therefore, process modules such as process module 302 may have multiple zones that have separate inputs that are each separately controlled.

PCMD 300 is a device capable of measuring one or more process conditions at one or more points. Typically, it is desirable to have a PCMD that closely resembles the substrates that are processed by the process module that is being characterized. For example, the physical dimensions may be close to those of regular substrates so that the PCMD may fit in the same locations and may be handled by the same automation systems that handle substrates. The thermal characteristics may resemble those of regular substrates so that any temperatures measured are similar to those that would exist when a regular substrate is processed. Examples of PCMDs are described in Published U.S. Patent Application 20040031340, filed on Jan. 24, 2002 and patent application Ser. No. 10/718,269 filed on Dec. 3, 2003, which applications are herein incorporated by reference in their entirety. A PCMD generally includes a substrate that is similar or identical to the substrates handled by processing modules being characterized. The substrate has sensors attached to it. A PCMD may have sensors distributed to measure one or more process conditions at one or more locations. Sensors used in PCMDs may include sensors to measure temperature, pressure, chemical concentration, fluid flow rate, ion current density, deposition rate, etch rate and location. Because the dimensions and other physical properties of a PCMD are close to those of a regular substrate, it may be assumed that the measurements of conditions made by sensors of the PCMD provide values that are equal to the values that exist when regular substrates are processed in a process module. PCMD 302 may be thought of as an instrumented substrate. The term "substrate" is used throughout this application to mean both substrates used to make devices such as integrated circuits and flat panel displays, and also substrates that are instrumented to act as PCMDs.

PCMD 300 may send data to the modeling system 310 by cable or wirelessly. When a cable is used, a modeling unit in may receive data in real-time and power may be supplied to the PCMD 300 via the cable. However, a cable may interfere with some measurements because it affects the process conditions in the process module. Placing a PCMD with a cable may require opening up a module to allow the cable to extend to the outside. This may interfere with the proper operation of the module. For example, where a process module is under vacuum or filled with a particular gas, it may need to be vented and opened to place the PCMD. It may then take some time to pump down the module. A wireless PCMD may allow the PCMD to be handled as a regular substrate. Thus, a PCMD may resemble a silicon wafer and may be transferred from a wafer cassette or Front Opening Universal Pod (FOUP) to a process module by a robot that is configured for handling silicon wafers. This is less intrusive and may take less time than using a PCMD with a cable. However, a wireless PCMD is limited by the amount of power it can use. Typically, a battery provides power and the size of the battery determines how long the PCMD may be used. A wireless PCMD may transmit data from a process module to a base station in real-time or it may store the data for later transmission. If it is stored, a memory must be provided in the PCMD. In one embodiment, a PCMD is designed to resemble a silicon wafer and a handling system is provided that resembles a FOUP in which the PCMD may upload data and receive power to recharge its battery.

The modeling system 310 may be a software application running on a processing unit. Typically, a personal computer or workstation is used to run the modeling system. The modeling system may be run adjacent to the process module 302 or may be at a remote location. The modeling system 310 may be used to develop a process model from the data.

Model 312 may be a dynamic process model. A dynamic process model is a predictive model of relationships between process inputs and process outputs. This is a model that is capable of predicting the process outputs that will result from a particular set of process inputs, or predicting the process inputs necessary to obtain a desired set of process outputs as shown. Such a model may provide a characterization of the relationships between the process conditions and the process inputs that affect them. The effects of various inputs on a single output are modeled. Thus, for large substrates with many zones and interactions between zones, the interactions may be modeled to provide an accurate prediction of the effects of inputs in certain zones on the output in other zones. Process inputs such as power may be monitored directly. Where process inputs are affected by operating parameters such as setpoints, the relationships between operating parameters and the process output may be directly modeled. Thus, operating parameters may be treated as process inputs for modeling purposes. Values for particular parameters that will provide a desired result may be obtained from the model and may be entered into the controller to obtain a desired result in the process module.

Figure 3B:
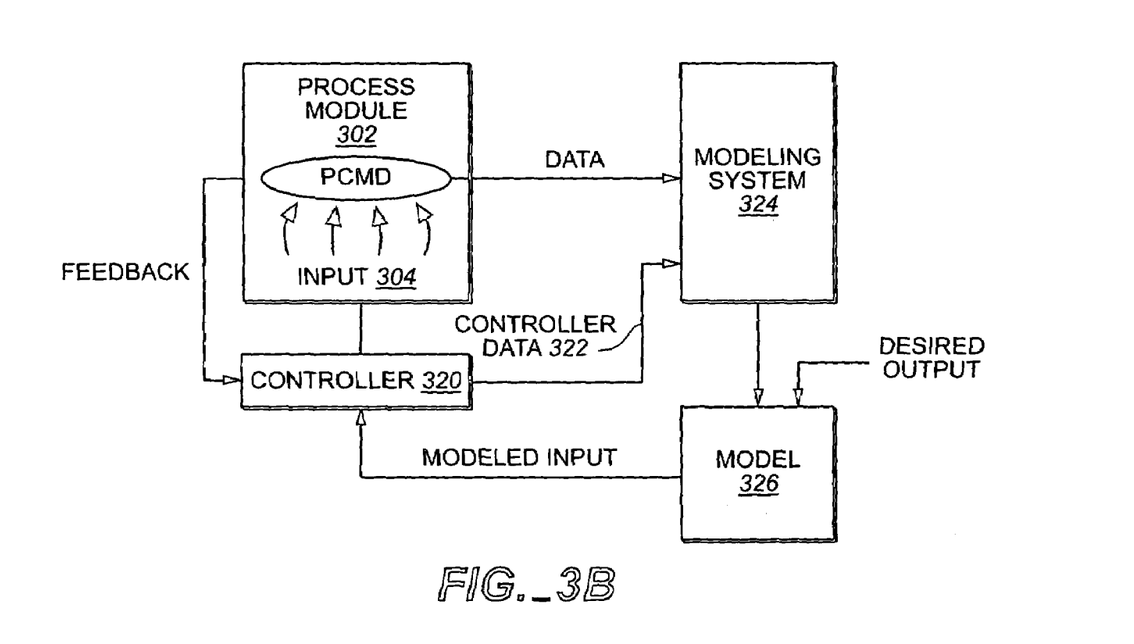
FIG. 3B shows a model-based process module tuning system according to another embodiment of the present invention.

FIG. 3B shows another embodiment of the present invention. In this example, a feedback controller 320 is used to control process inputs 304 in the process module 302. The feedback for the controller 320 may come from one or more sensors in the process module 302. Where a particular process condition value is desired, the controller adjusts process input 304 to achieve that value. The modeling system 324 receives controller data 322 from the controller 320. This may be achieved by connecting a cable directly to the controller 320 to obtain controller data 322 that is then passed to the modeling system 324. Controller data 322 may include the feedback data that the controller 320 receives from the process module 302 and data regarding process input 304. In addition, the modeling system 324 may receive information regarding the controller constants such as PID constants. In some embodiments it may be possible to make real-time adjustments to the controller. Operating parameters such as setpoints, offsets, PID constants or maximum and minimum power values may be adjusted.

Figure 4:
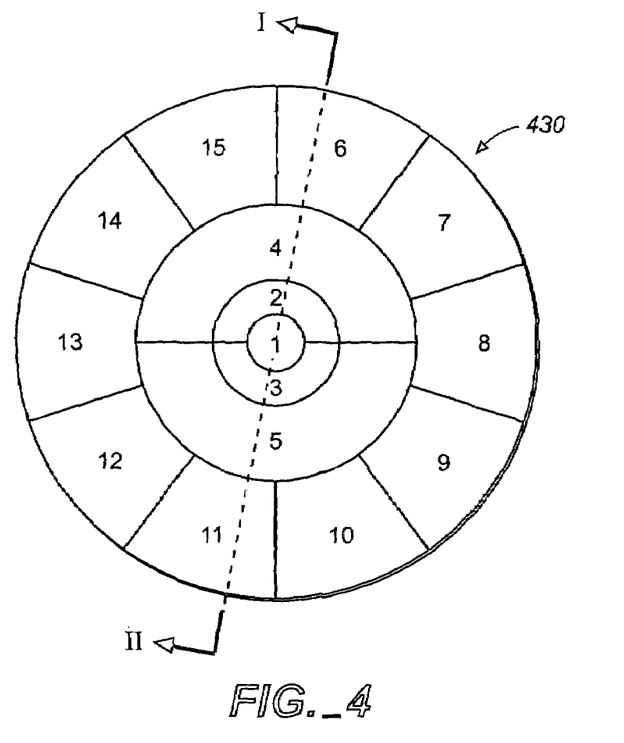
FIG. 4 shows a multi-zone hotplate that may be tuned using aspects of the present invention.

One example of a process module that may benefit from the tuning techniques of this invention is a multi-zone hotplate. This example is now described in more detail. A hotplate 430 for processing 300 millimeter wafers is shown in FIG. 4. Hotplate 430 has 15 heating zones, numbered 1-15. The zones vary in size with some being larger and thus requiring more heat. Zones also vary in shape. Some zones are surrounded by other zones while some are at the periphery of the hotplate and may lose heat to the surroundings. Zones have heating elements that may be different in size and configuration. Heating elements may wear out at different rates so that their performance changes differently over time. Examples of hotplates having multiple heating zones are the ACT line of products made by Tokyo Electron. Hotplates may have a different number of zones. For example, seven-zone hotplates are commonly used.

Figure 5:
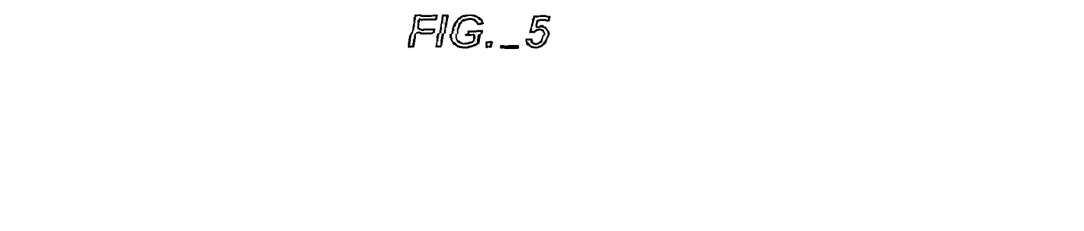
FIG. 5 shows a cross-section of the multi-zone hotplate of FIG. 4.

FIG. 5 shows hotplate 430 in cross-section along the line I-II of FIG. 4. This view shows a PCMD 550 on the hotplate. In some hotplates, a substrate (or PCMD) lies on the surface of the hotplate. In other hotplates, the substrate is supported above the surface of the hotplate so that there is a gap between the substrate and the hotplate. A cover may extend over the hotplate when a substrate is present to provide better thermal stability. In some examples, such covers have additional heating elements. Hotplate 430 is shown in cross-section so that several zones are visible. Zones 1-6 and 11 are shown. Heating elements 551-557 are shown with one heating element per zone. Zones 1-6 and 11 have temperature sensors marked as $M_1$-$M_6$ and $M_{11}$ with one temperature sensor per zone. PCMD 550 has temperature sensors marked $S_1$-$S_6$ and $S_{11}$ located such that they overlie the zone with the corresponding number. In many cases, a PCMD has more than one temperature sensor per zone, particularly for larger zones. However, for simplicity, only one sensor per zone is shown in FIG. 5.

Figure 6:
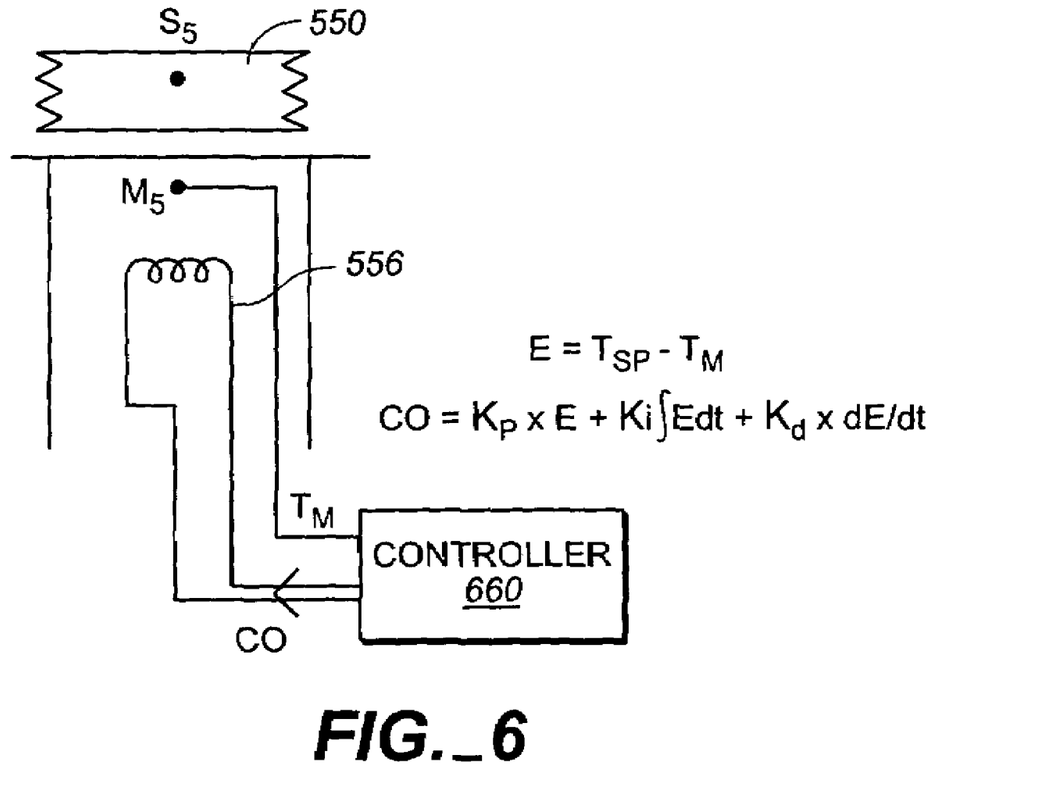
FIG. 6 shows an individual zone of the multi-zone hotplate of FIGS. 4-5.

FIG. 6 shows zone 5 of hotplate 430. Zone 5 has a temperature sensor $M_5$ that measures the temperature $T_M$ at a point in zone 5 of hotplate 430. The controller 660 receives a signal indicating the temperature $T_M$. The Controller Output (CO) determines the power supplied to heating element 556. The controller 660 of FIG. 6 is a PID controller that determines the CO according the equations shown. A setpoint temperature $T_{SP}$ is the desired temperature set by a user through a recipe or routine. The difference between $T_{SP}$ and the measured temperature $T_M$ is the error E. The controller responds to the error according to the PID equation shown. Other controllers may use different equations to determine the output. The temperature of each zone is separately controlled by a controller in response to the temperature measurement received from the temperature sensor of that zone. The heating element 556 may be a resistive heater that is embedded in zone 5 of the hotplate so that its heat is directed to the portion of a substrate that is above zone 5. The zones are controlled as if each was independent of its neighbors with the power being adjusted independently of the power of the adjacent zones. However, due to the conduction of heat between zones, adjacent zones are not fully independent. Increasing the heat input to one zone may produce an increase in temperature in an adjacent zone. Tuning such a hotplate by conventional methods may be difficult because of the interaction between zones.

Also shown in FIG. 6 is a portion of PCMD 550 that contains a sensor $S_5$. Sensor $S_5$ may provide a more accurate measurement of substrate temperature than that provided by sensor M because sensor S is embedded in the substrate. Substrate temperature is usually more important than hotplate temperature because substrate temperature may directly affect devices formed in or on a substrate. Typically, sensor S will record a temperature $T_S$ that is lower than temperature $T_M$ because of heat loss from the substrate. The temperature $T_S$ is measured in a region of the substrate that overlies zone 5 of FIG. 6. Both temperatures $T_S$ and $T_M$ and controller output CO from several zones may be used to create a dynamic process model. The temperature $T_S$ may be greatly affected by the heat output of the heating element of this zone. However, other zones not underlying sensor S also affect the temperature $T_S$. This complicates tuning of multi-zone modules.

Figure 7A:
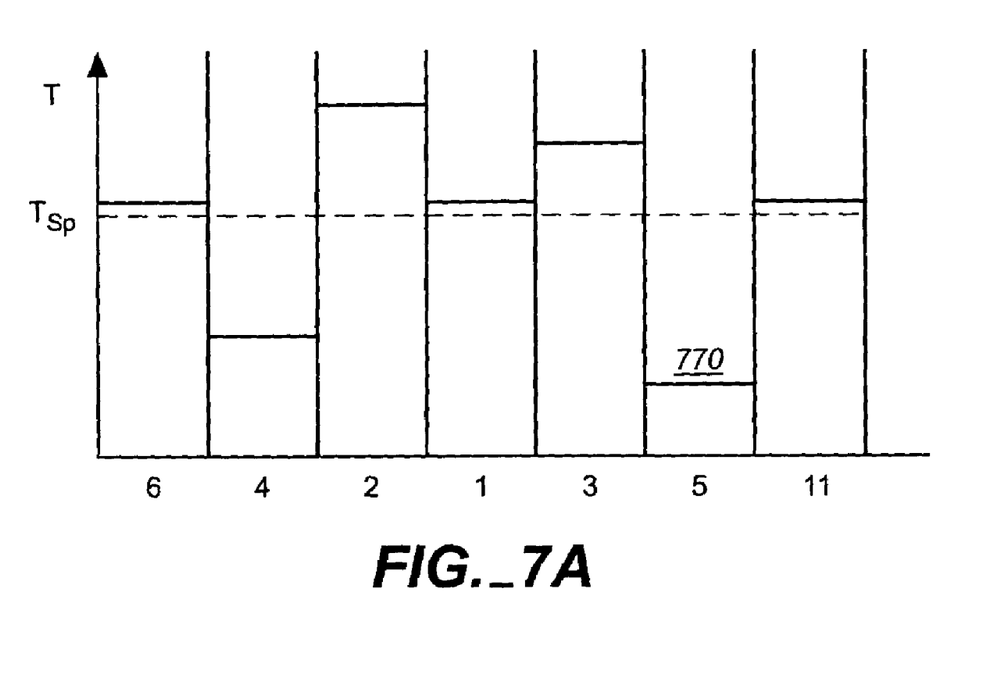
FIG. 7A shows temperature across the zones of the multi-zone hotplate of FIGS. 4-5 prior to adjustment.

FIG. 7 illustrates the difficulty of tuning a multi-zone module with interacting zones. FIG. 7A shows the temperature across zones 1-11 of FIG. 5. Tsp is the setpoint temperature that the controller is attempting to establish across a substrate.

Figure 7B:
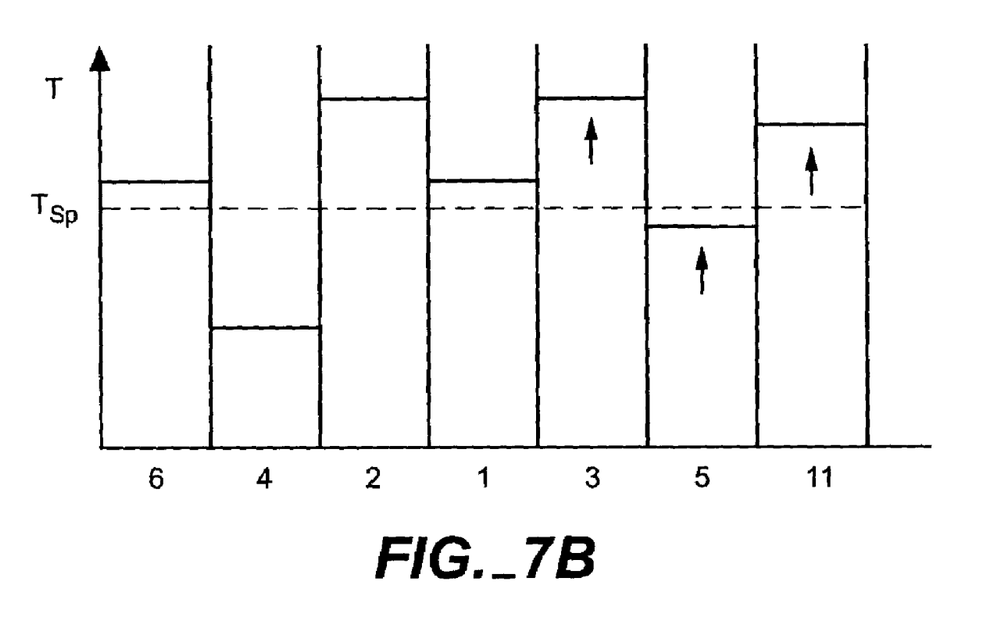
FIG. 7B shows temperature across the zones of the multi-zone hotplate of FIGS. 4-5 after adjustment.

The zone temperatures shown are the temperatures measured by the sensors of the PCMD. The temperature 770 in zone 5 is below the setpoint Tsp. Temperature 770 may be the temperature of PCMD 550 measured by $S_5$ or may be hotplate temperature measured by $M_5$. Based on this reading a user might attempt to increase the temperature in this zone. This might be achieved by increasing the power delivered to zone 5. One way to do this is to increase the setpoint for zone 5. This could be done by directly adjusting the setpoint or by adjusting an offset if the controller supports the use of offsets. An offset has the advantage that the same setpoint may be sent to the controller for all zones with each zone having its setpoint determined according to its offset instead of requiring a set of individualized setpoints. The setpoint of zone 5 is adjusted by an amount calculated to bring zone 5 to the temperature setpoint Tsp. However, this adjustment of the temperature of zone 5 also affects the neighboring zones 3 and 11 as shown in FIG. 7B. Zone 11 was close to the setpoint temperature Tsp prior to the adjustment. After adjustment, the temperature in zone 11 has increased so that it is no longer near the setpoint temperature Tsp. The temperature of zone 5 which was already above the setpoint temperature Tsp is now even higher and even further from Tsp. Now, both zones 3 and 11 need to be adjusted and this may affect other zones. In reality, the situation is more complicated because a zone has more than two neighbors. Zone 5 is also adjacent to zones 8, 9, 10, 12, 14 and 4. Each of these zones may need to be adjusted because each is affected. However, they may each be affected by different amounts so that a single adjustment to neighboring zones is not practical. Thus, tuning in this way requires multiple iterations to achieve a desired output. After each change, some stabilization time may be required before the next step making this technique time consuming.

Data Collection

A process module characterization routine according to an embodiment of the present invention includes two parts, collecting data and building a model from that data. Collecting data may be done in a variety of ways. One way to obtain data about the interaction between zones of a hotplate is to cause a change in the input to one zone and record the effect on other zones. This may be done for each zone in sequence so that the interactions between all zones are measured. This data collection process is referred to as a "bump test" because each input is "bumped" or increased to a level higher than its neighbors. The input data may come from the controller while output data may be gathered from both the controller and a PCMD. The bump test may be carried out when the process module is at or near the conditions for which it is being tuned. For example, if a hotplate is to be run at 120 degrees Centigrade, the bump test may be carried out at 120 degrees Centigrade with all zones raised to approximately this level and then individually bumped to a higher level. Thus, both steady-state and dynamic conditions are recorded. When a zone is "bumped", the change in the neighboring zones is recorded over time. The bump provides an excitation of the system, which is otherwise in a steady-state condition.

Figure 8A:
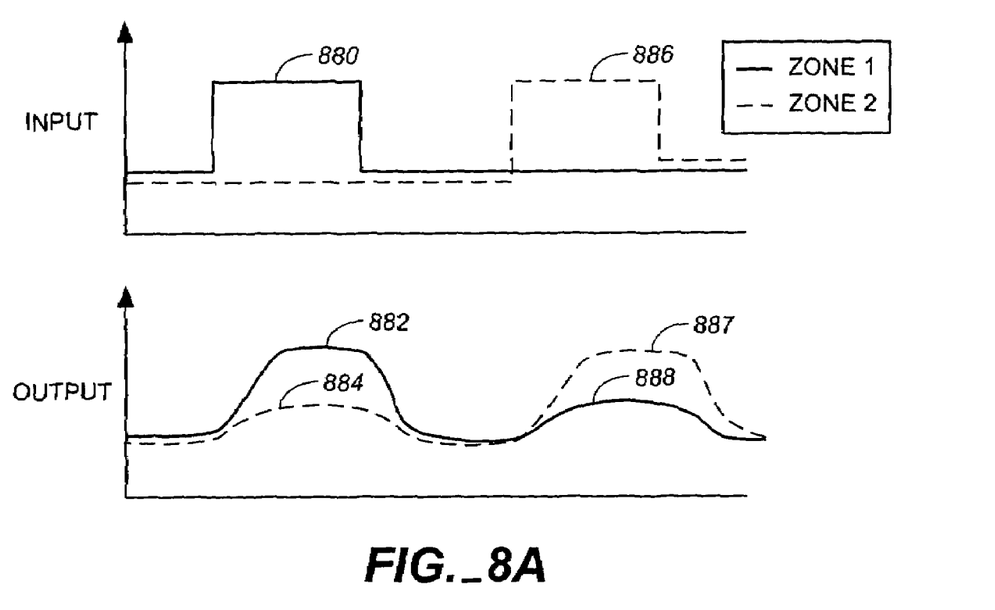
FIG. 8A shows the input and output of zones 1 and 2 during a bump test of zones 1 and 2.

FIG. 8A shows the process inputs and process outputs for two zones during a bump test. This could represent the two zones of a two-zone hotplate or two zones of a hotplate having more than two zones. The test starts with the hotplate in a steady-state or thermal equilibrium with temperatures being stable. In this state, zones gain heat from their heating elements or from surrounding zones at the same rate at which they lose heat to a substrate, PCMD, surrounding air or neighboring zones. A first bump 880 is provided to zone 1. This is an increase in the heating power (input) delivered to zone 1 of the process module. The increase in power in zone 1 results in an increase 882 in temperature (output) in zone 1 as shown by the output graph. The temperature shown may be obtained from a sensor in the hotplate or from a sensor in a PCMD. The increase in power in zone 1 also results in an increase 884 in temperature in zone 2. This is a smaller temperature increase than that of zone 1, however it may still be significant. The input of zone 1 is then returned to the steady-state condition. The temperatures in both zones 1 and 2 return to their steady-state values after the input is returned. Next, the input to zone 2 is provided with a bump 886. Here, the zone 2 temperature has a more significant increase 887 than zone 1 temperature increase 888. However, the zone 1 temperature also increases significantly. Both temperature profiles are recorded. The zone 2 input is then returned to its steady-state value. Thus, the effect of increasing power in zone 1 on the temperature of zone 2 is recorded and the effect of increasing power in zone 2 on the temperature in zone 1 is recorded.

Figure 8B:
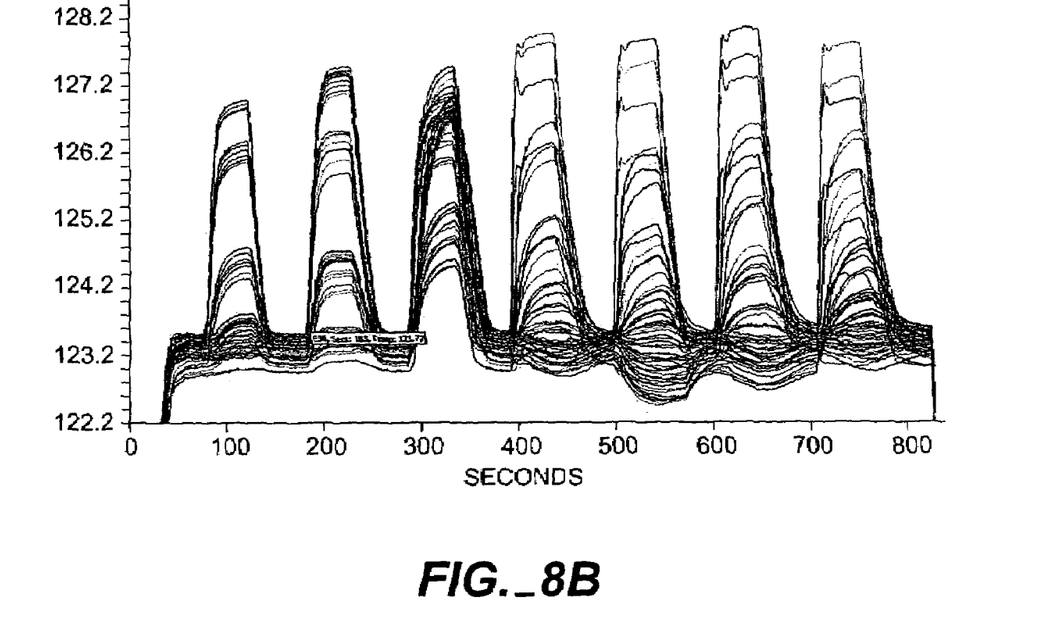
FIG. 8B shows wafer temperature from a PCMD during bump testing of a multi-zone hotplate.

FIG. 8B shows temperature measurement data during a bump test in a multi-zone hotplate. It can be seen that the interaction between zones is complex with so many zone temperatures being affected by multiple zones. Each zone in turn is bumped while the temperature data is recorded. It is desirable to complete a bump test as a single operation without removing the PCMD during the test so that no change in background conditions is introduced. Where there are many zones there may be power constraints that limit the data that may be collected in a single operation. This may require choosing to record particular data that are of interest. For example, transient data might be disregarded (not recorded) if the transient performance of the hotplate was not being tuned. In another situation, only transient data might be recorded to maximize the data on transient performance to allow tuning of this performance. The data sampling rate may be limited in order to conserve power. For example, data may be collected every 2 seconds during data collection so that data collection can be performed for a multi-zone hotplate at one time, without needing to recharge the PCMD.

In some embodiments, controller data is recorded in addition to data from the PCMD. The controller data may include the heat power delivered to the heating elements of the zones, the temperature setpoints and offsets used by the controller to determine the power delivered to the zones and the temperature measurements from the hotplate temperature sensors. In addition, operating parameters that determine the response of the controller to an error (difference between setpoint and measured temperature) such as PID constants and maximum and minimum power values may be recorded to be used in developing a model.

Where a PCMD stores data for later transfer to a modeling system, it may be necessary to align the PCMD data with other data. Where data is recorded from both a PCMD and a controller in real-time, in the same location, the data will be recorded in a synchronized form. However, where controller data are recorded in one location and PCMD data are stored in the PCMD, the two sets of data may be synchronized when the PCMD data are downloaded. Synchronization may be achieved by overlaying the two sets of data and visually aligning graphs. Alternatively, data may be automatically aligned by software based on the qualities of models derived using different time offsets.

Several alternatives to bump testing are possible for exciting the system to collect data. Various signals may be provided to excite one or more zones at a time to perturb the system. Sinusoidal, step or random inputs may be provided for this purpose. One alternative is to record temperature changes when a PCMD is placed on a hotplate. This uses the excitation provided by the hotplate coming into contact or into close proximity with the PCMD. Initially, the PCMD is at a different temperature to the hotplate. Usually, the PCMD is at or near room temperature while the hotplate is at some elevated temperature. Thus, when the PCMD is placed on the hotplate, the temperature in all zones of the hotplate decreases while the temperature for all sensors of the PCMD increases. When the hotplate temperature drops, the controller increases the power delivered to the heating elements of the zones so that the temperature eventually returns to a setpoint level. Different zones may experience different drops in temperature and consequently may experience different responses. This provides a range of conditions across the PCMD, which may allow sufficient data to be gathered to produce a dynamic process model.

Model Building

Figure 9:
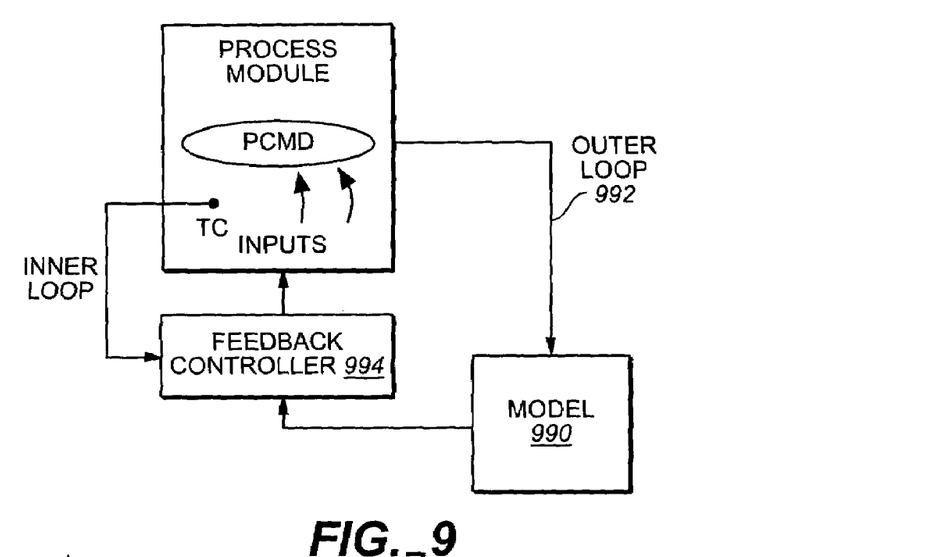
FIG. 9 shows a tuning system according to an embodiment of the present invention that has an outer feedback loop and an inner feedback loop.

Once the data is collected it may be used to produce a dynamic process model of the relationships between the process inputs and process outputs of the system. Thus, the relationships between the heat inputs and the temperature of the substrate or PCMD may be modeled. This model may then be used to tune the controller so that a particular output is achieved. Thus, the model may be thought of as providing additional feedback control for the process module. This feedback is in addition to the feedback control provided by a feedback controller connected to the process module. FIG. 9 shows how a model 990 may provide an outer feedback loop 992. Outer feedback loop 992 may be used to tune the controller 994 so that the inner feedback loop is tuned to achieve a particular result. Model building may be done in real-time, as data is collected, or at a later time. Model building may be done on-line while connected to the process module or may be done off-line.

Identifying a model that accounts for the interactions between zones may be done in a variety of ways. One way to identify such a model uses auto-regressive external-input (ARX) modeling combined with a least-squares estimation technique. An ARX model may be written as $$y(t) + A_1 y(t-1) + \ldots A_n y(t-n) = B_0 u(t) + B_1 u(t-1) + \ldots B_n u(t-n) + e(t) \quad \text{(Eqn.2)}$$

where y(t) is some process output at time "t" and u(t) is a process input at time "t" and e(t) is the error or the difference between the modeled value of y(t) and the actual value of y(t). Constants $A_1$-$A_n$ and $B_0$-$B_n$ are adjusted to provide a model that conforms as closely as possible to the experimentally derived data. Thus, knowing y(t), y(t-1) ... y(t-na) and u(t), u(t-1) ... u(t-nb), values may be determined for $A_1$, $A_2$ ... $A_{na}$ and $B_0$, $B_1$ ... $B_{nb}$. Such values may be determined by minimizing the error e(t) for some range of t, for example by minimizing the variance for a range of t. Thus, a model is obtained that gives the relationship between the modeled outputs at any time "t" and the modeled inputs for some time up to and including time "t." Because the model contains terms from time t to some time t-n, the model provides a characterization of both the static and dynamic performance of the system.

The steady-state (D.C.) gain of the system may be calculated from the model using Singular Value Decomposition (SVD). SVD is a conventional method described by G. Golub, et al., *Matrix Computations*, The Johns Hopkins University Press (Boston 1996), which is hereby incorporated by reference in its entirety. The steady-state gain is a matrix of values that give the relationship between particular inputs and outputs under static conditions. This matrix includes off-diagonal terms as well as diagonal terms so that the effects of more than one input on each output are modeled. In some cases these off-diagonal terms may have a significant effect on an output. Thus, a predictive model is obtained in the form:

$$T = G \cdot U \quad \text{(Eqn. 3)}$$

Where T is a set of outputs of the system, U is a set of inputs to the system and G is a gain matrix that expresses the dependence of T on U. Thus, the outputs that will be produced by a particular set of inputs may be predicted. The gain matrix may also be calculated for conditions other than steady-state conditions. For example, the gain for a transient region may be calculated and used to predict output in this region. The gain equation may also be inverted and written as:

$$U = G^{-1} \cdot T \quad \text{(Eqn. 4)}$$

Such inversion may be achieved according to various well-known methods. This equation allows a set of desired outputs to be entered into the model so that the inputs needed to produce the desired outputs may be predicted. The dynamic process model does not require knowledge of the physical characteristics of the system such as physical dimensions, geometry and materials used. It is derived from empirical measurement of inputs and outputs and may therefore be applied to process modules of differing construction. Because the dynamic process model is not based on assumptions about the process module and its construction, it can be easily adapted to different modules or may be easily be reapplied to a module that is reconfigured.

A more detailed discussion of how a dynamic process model may be identified, and how a steady-state gain matrix may be derived is provided by Ekblad et al in U.S. Pat. No. 5,920,478 which is hereby incorporated by reference in its entirety. A model-based system is disclosed in this reference that uses a dynamic process model to derive the steady-state gain matrix and then uses the gain matrix to decouple multiple inputs. In an embodiment of the present invention, the same techniques may be used to obtain a gain matrix that allows inputs to be decoupled.

A gain matrix allows accurate prediction of output values taking account of the effects of multiple inputs on a single output. Thus, for the example of a hotplate, the effects of some or all of the zones of the hotplate on the temperature at a particular point of a substrate are modeled. This allows accurate estimation of the effects of changing the power in one zone on the temperature throughout the substrate. Inputs are not limited to heat power inputs. Temperature setpoints may be entered as inputs to the model so that the effect of changing a temperature setpoint may be modeled directly. Alternatively, a first model may be derived that gives the relationship between setpoints for modeled zones and the heat power delivered to the modeled zones. A second model may be derived for the relationship between substrate temperature and power. To obtain a particular temperature profile, the required powers are obtained from the second model. Then, these powers are put into the first model to determine the temperature setpoints needed to produce such powers.

In an embodiment of the present invention, power output for each zone, hotplate temperature for each zone and substrate temperature from several sensors of a PCMD are used to obtain a model that includes relationships between these variables. From this model, a gain matrix is obtained that gives substrate temperatures for particular hotplate temperatures and power outputs. If this matrix is inverted, settings to produce a desired substrate temperature profile are obtained.

For two zones of a hotplate, a model may be identified and used to determine a steady-state gain matrix for the system.

Where the inputs are temperature setpoints for the two zones and outputs are actual substrate temperatures, the gain matrix is a two-by-two matrix that may be written as:

$$\begin{pmatrix} T_1 \\ T_2 \end{pmatrix} = \begin{bmatrix} C_{11} & C_{12} \\ C_{21} & C_{22} \end{bmatrix} \begin{pmatrix} SP_1 \\ SP_2 \end{pmatrix} \qquad \text{(Eqn. 5)}$$

where $T_1$ and $T_2$ are the actual temperatures of the PCMD at points overlying zones 1 and 2 respectively. $SP_1$ and $SP_2$ are the setpoints for zones 1 and 2 respectively. The diagonal terms $C_{11}$ and $C_{22}$ may be larger than the off-diagonal terms $C_{12}$ and $C_{21}$. However, $C_{12}$ and $C_{21}$ are still significant and are taken into account in this model. In some hotplates, the off-diagonal terms may be greater than the diagonal terms for some zones. This is a result of hotplate geometry where a large zone may partially surround a smaller zone and the heat input from the larger zone may dominate over the input from the smaller zone in the area of the substrate above the smaller zone. By inverting the gain matrix, values of $SP_1$ and $SP_2$ may be obtained for particular values of $T_1$ and $T_2$. Similarly, for greater numbers of zones, a larger matrix is obtained that may be used to relate inputs such as setpoints and outputs such as substrate temperature. The values of $SP_1$ and $SP_2$ obtained may then be entered as setpoints for the hotplate. In some embodiments, temperatures at points between sensors may be derived from sensor data and used to build the model. This provides additional data points for model building and may improve model accuracy.

In addition to tuning for steady-state conditions, tuning may also be performed to improve performance in the transient region. Where the controller is a PID controller, such tuning may involve modifying the PID constants to change performance of the system. For example, the gains of the different zones of a hotplate may be adjusted to ensure that hotplate temperature rises uniformly or to maintain a uniform thermal dose for all regions of a substrate. Where the response of the controller is known (the equations used are known) this may be done directly. However, where the equations used by the controller are not know, alternative methods of tuning the transient response may be used.

In some controllers, references may be adjusted to temporarily adjust the setpoint of a particular zone. A reference provides a setpoint offset that may be dynamically adjusted. Thus, where a substrate temperature is slow to rise to its setpoint, the reference for that zone may be adjusted to temporarily provide a higher setpoint to force the controller to ramp the temperature more rapidly. When the temperature approaches the setpoint, the reference may be adjusted back to its normal level so that the zone temperature does not overshoot but stabilizes at the setpoint. In this way, the performance of the controller during the transient portion may be adjusted even where the details of the control algorithms used by the controller are not known.

In some situations, it may be possible to use a dynamic process model to implement feed-forward control features. One situation where feed-forward control may be used is to reduce the time necessary to stabilize a process condition after a substrate is placed in a process module. Normally, when a substrate is placed in a process module there is some stabilization period required before the system reaches equilibrium. For example, where a silicon wafer is introduced into a deposition module such as a vertical furnace, it may take some time for the wafer to reach the temperature required for the deposition process even where the furnace is already at deposition temperature. This time may be wasted and impacts throughput of the system. By providing an increase in temperature to the furnace before or during loading of the wafer, temperature stabilization may be achieved much more quickly.

Figure 10A:
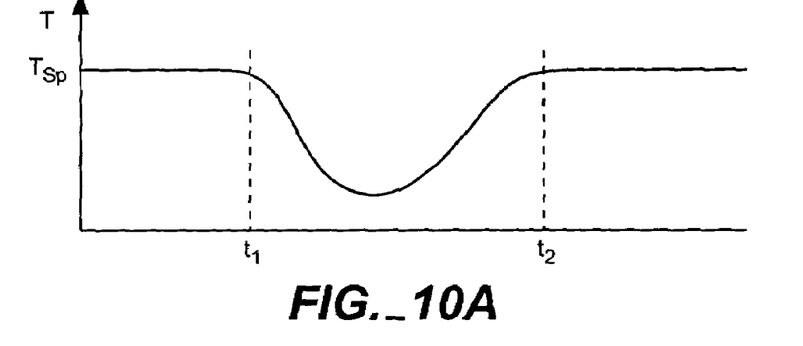
FIG. 10A shows a temperature profile when a wafer is placed in a process module.
Figure 10B:
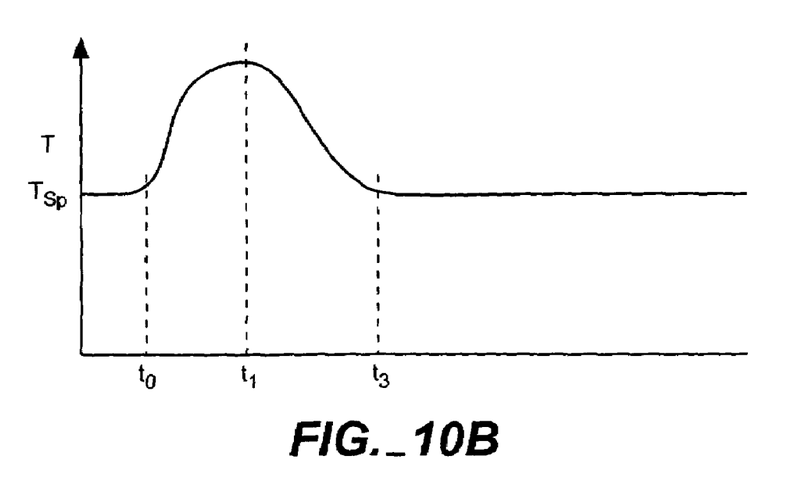
FIG. 10B shows a temperature profile where feed-forward control provides an increase in temperature prior to placing the wafer in the process module.

FIG. 10A shows an example of a process module temperature profile where a substrate is introduced at time $t_1$. The temperature drops from the setpoint temperature Tsp as the wafer is introduced because the wafer is at a lower temperature. Subsequently, the controller increases power to the heater or heaters of the process module to return to the setpoint temperature Tsp. At time $t_2$, the setpoint temperature is achieved and the process module is ready for further processing steps. The time between introduction of the substrate to stabilization at the setpoint ($t_2 - t_1$) may have an effect on the efficiency of the system. FIG. 10B shows the same process module receiving a substrate where feed-forward control is used. At time $t_0$ the process module begins to ramp up the temperature in the module to compensate for the substrate that it is about to receive. When the substrate arrives at time $t_1$ the process module is at a higher temperature than the desired temperature for the substrate. The substrate then causes a drop in temperature to the setpoint temperature Tsp and the next process step may begin. Thus, the time necessary to achieve stabilization is $t_3 - t_1$. This is considerably less than the time needed without feed-forward control ($t_2 - t_1$). While some time is used to ramp up temperature ($t_1 - t_0$), the hotplate is otherwise idle (no wafer present) at this time and so the ramping need not affect processing time or throughput. The timing and power level used to produce the feed-forward control may be derived from a model so that the effect of the substrate on the process module is counteracted. The module may determine when a wafer will be placed in the module through communication with a substrate handling system such as a robot, or from the opening of a cover. Thus, the power may be increased at the appropriate time in anticipation of the arrival of the substrate. Real systems are more complex than shown in FIG. 10 because of differences in temperature and difference in heat transfer rates across the substrate. However, as previously described, interactions between different zones may be modeled. Thus, feed-forward control may also be based on a dynamic process model that includes interactions between zones.

In some process modules, it may be desirable to tune a particular process condition to be non-uniform. Typically, uniformity is desired so that every die on a wafer experiences the same process conditions and therefore each die has the same characteristics. However, sometimes it may be advantageous to provide a particular non-uniform profile for a process condition across a substrate. One example where a non-uniform profile may be preferred is for a hotplate used for post exposure bake (PEB) of photoresist. During a PEB step, photoresist is heated to promote chemical reactions in the photoresist. Chemically amplified photoresist is extremely sensitive to temperature variations during this step. Variation in temperature from one portion of a wafer to another may cause variation in Critical Dimension (CD) of devices formed. Differences of less than one degree Centigrade may cause significant changes in CD. Thus, it is generally desirable to have CD uniformity across the wafer. However, uniform temperature of the PEB step does not always produce CD uniformity. Variations across the wafer during prior process steps may result in CD non-uniformity where PEB temperature is uniform. Thus, to obtain CD uniformity, it may be necessary to tune the PEB hotplate to be non-uniform. To achieve the non-uniformity designed to produce uniform CD measurements across the wafer, a dynamic process model may be used. The relationship between CD and PEB temperature may be known or determined from experiment. A profile of CD across a substrate may be used to derive a temperature profile that compensates for CD variation. A gain matrix may then be used to estimate the temperature setpoints that would produce the needed temperatures to provide uniform CD. Alternatively, a model may be identified that directly relates CD to temperature setpoint or some other input parameter. Thus, an inverted gain matrix may be used to predict the setpoints or inputs required to achieve uniform CD.

In some model building examples, it may be advantageous to ignore some of the collected data. For example, data from a particular sensor may be incorrect because the sensor is defective or the connections to the sensor are defective. It may be advantageous to ignore some sensor data even when they are accurate. For example, where there is some local effect near a sensor that does not reflect the normal temperature condition at that point, or cannot be tuned out, it may be better to ignore the reading. Some modules have substrates held by pins. Contact between the substrate and such pins or other irregularities may make affect a sensor's output. If such conditions are localized and cannot be compensated for by tuning, it may be better to ignore them. A user may select particular measurements to be ignored during model building. This may be done on a case-by-case basis or according to some predetermined criteria. The selection may be automated so that erroneous data is automatically discarded. Where data is discarded, the model input corresponding to the discarded data may be fixed at some predetermined value. For example, the value may be fixed at the setpoint for the zone corresponding to that sensor. Alternatively, the value may be allowed to float at the level of surrounding sensors. Thus, an average of surrounding sensor readings may be calculated and substituted for the sensor reading to approximate the temperature at the sensor. Either of these techniques allows a model to be constructed where some of the data is not usable. This fixed/float feature allows a user to select the data that produce the most useful model for the user's purposes. Particular data may be included in the model or excluded using the fixed/float feature until an accurate stable model is derived for the particular process characteristics that the user wants to tune. In one example, a first model is obtained using all collected data. Subsequently, certain data is screened out using the fixed/float feature and a new model is derived. Data may be selectively screened out until a satisfactory model is obtained. Where a sensor measurement is disregarded using the fixed/float feature, the model assumes a value for the sensor measurement that does not depend on the controller output for that zone. Thus, there is no feedback control for that zone in the model. This may be advantageous where a model that includes such feedback control for the zone requires a process input (heat power) that is outside the range that may be supplied by the heating element for that zone. For example, where a model requires negative heat power for a particular zone, that zone may be fixed or floated for model building purposes, so that the model does not include control of the temperature of the zone using the heat power to that zone. This is a way to disregard model solutions that may not be physically possible and constrain the model to what is, physically possible.

A fixed/float correction may also be applied after a model is identified. Where a steady-state gain matrix is obtained using some or all of the recorded data, a zone may be fixed or floated by eliminating the row or rows of the matrix that correspond to the temperature for that zone. For example, where a gain matrix is obtained for the temperature dependence on setpoints, certain rows of the matrix may be eliminated to improve the model.

$$\begin{pmatrix} T_1 \\ T_2 \\ T_3 \\ \vdots \end{pmatrix} = \begin{bmatrix} G_{11} G_{12} G_{13} \ldots \\ G_{21} G_{22} G_{23} \ldots \\ G_{31} G_{32} G_{33} \ldots \\ \vdots \end{bmatrix} \begin{pmatrix} SP_1 \\ SP_2 \\ SP_3 \\ \vdots \end{pmatrix} \quad \text{(Eqn. 6)}$$

Equation 4 shows a gain matrix that gives the relationship between temperatures at various points on a substrate ($T_1$, $T_2$ . . . ) and temperature setpoints for different zones ($SP_1$, $SP_2$ . . . ). Here there is a one-to-one correspondence between temperatures and zones, so that each zone has one temperature sensor. If zone 2 is to be fixed or floated, then the row of the matrix corresponding to zone 2 temperature is eliminated. Thus, the equation becomes:

$$\begin{pmatrix} T_1 \\ T_3 \\ \vdots \end{pmatrix} = \begin{bmatrix} G_{11} G_{12} G_{13} \ldots \\ G_{31} G_{32} G_{33} \ldots \\ \vdots \end{bmatrix} \begin{pmatrix} SP_1 \\ SP_2 \\ SP_3 \\ \vdots \end{pmatrix} \quad \text{(Eqn. 7)}$$

This equation may be inverted to obtain setpoints ($SP_1$, $SP_2$ . . . ) that do not depend on $T_2$. This may be repeated for other temperature readings to improve the modeled predictions.

In some environments, module-to-module tuning may be critical to producing a consistently satisfactory product. Module-to-module tuning may require separate tuning of two or more modules to a common standard. The common standard may be a process condition such as temperature or a process output such as uniform CD. Where one module is tuned to provide uniform CD, another module may be matched to the first module by tuning it to provide uniform CD that is the same as the CD of the first module within some tolerance. As described above, sometimes providing uniform CD requires tuning to provide non-uniform temperature in a PEB step. Where more than one hotplate is used in parallel for PEB, it is important that both hotplates provide the same non-uniform temperature profile. The orientation of the non-uniform profile may be important where the profile is not radially symmetric. Because the non-uniform temperature profile is used to compensate for non-uniformities of previous steps, it is important that substrates and the hotplate profile are correctly oriented with respect to each other. Wafer orientation is generally automatically performed by a robot based on the location of a notch or flat on the edge of the wafer. Such automatic orientation may be performed on a PCMD if automatic handling allows. However, this may not always be possible. Orientation of the hotplate profile requires knowing the orientation of the PCMD on the hotplate during data collection. PCMD orientation may be determined from the results of a bump test or similar excitation by examining the data gathered. If a particular zone is "bumped" the sensors above that zone will have the greatest temperature increase. Thus, by mapping sensors to zones and knowing the positions of those sensors on the PCMD, the orientation of the PCMD relative to the hotplate zones may be determined. Using model-based tuning may allow module-to-module variation in hotplate temperature to be reduced to less than 0.1 degrees Centigrade.

Measurement by a PCMD may suffer from some measurement inaccuracy due to the inherent structure of the PCMD. For example, the substrate of a PCMD may be warped so that not all areas are the same distance from a hotplate surface. Certain sensors may consistently give readings that are too high or too low because of the structure of the sensor, the traces connecting to the sensor, the contact between the sensor and the substrate or other effects. Such errors may cause a sensor of the PCMD to consistently read too low or too high. One way to overcome this problem is to do repeated measurement with the PCMD placed in different orientations so that the effects of an individual sensor are averaged out. For example, data collection may be done with the PCMD in one orientation, then the PCMD may be turned through 90 degrees and another data collection may be performed. The average of several data collection runs with different PCMD orientation may be used to determine the model.

In addition to performing a tuning operation as described above, a fine-tuning step may be used to achieve a more precise result. A reconcile operation is a fine-tuning step that may be performed after model-based tuning of the system described above is completed. For a hotplate, a reconcile operation means making small adjustments to setpoints or offsets of individual zones to bring the temperature of the substrate overlying that zone to a target temperature. After model-based tuning there may still be small discrepancies between the target temperature in a zone and the measured temperature. The discrepancies may be measured under conditions that are close to, or identical with those experienced by production substrates. Thus, for reconciling a hotplate used for a bake at 125 degrees, the reconcile may be done with the hotplate at 125 degrees. Certain sensors may experience small deviations from 125 degrees. The temperatures across the substrate may be collected and used to calculate changes needed in temperature setpoints to produce the desired measurement at all points. This may be done either using the model or by making direct changes to offsets that ignore interaction between zones. The measured temperatures and desired temperatures may be entered into the model to calculate the necessary changes in setpoint to produce the desired temperatures. Using the model in this way takes into account the interaction between zones. As in a full model-based tuning, the fixed/float feature may be used in a reconcile operation to discard certain data when determining setpoints or offsets. Alternatively, a user may make small changes to setpoints without reference to the model. Changes to individual zones may be carried out without causing significant disturbance to neighboring zones at this stage because the hotplate is already tuned and so only very small changes are needed. While these changes may have an effect on neighboring zones, in some examples the effects may be disregarded because of their small scale. Therefore, this form of reconciliation ignores interaction between zones. Either form of reconcile operation is quicker than performing a full model-based tuning. A reconcile operation may be performed periodically during the operation of a process module to keep the module operating according to requirements. Using model-based tuning followed by a reconcile operation, temperature variation across a substrate may be reduced to less than 0.2 degrees Centigrade for a 300 millimeter wafer.

A PCMD may be used to periodically perform an audit operation to verify that a process module is performing according to requirements. An audit may simply involve placing a PCMD in a process module and running a routine or recipe while the PCMD records data regarding one or more process outputs. The data is examined to determine if the process output is within specified limits. For example, a PCMD may be placed on a hotplate to verify that temperature is within some limits at all points of the substrate.

Model-based tuning, reconciliation and auditing may all be used to provide a process module that is tuned to produce a desired output and that maintains the desired output over time. All three procedures may be used to keep the process module performing within specification and to ensure that product wafers stay within control limits. Model-based tuning may be carried out at installation and periodically thereafter. However, this does not have to be done often and may be more time consuming and complicated than needed for routine adjustment to keep the module within specified limits. Reconciliation may be used to fine-tune the process on a more frequent basis than model-based tuning. Reconciliation is simpler and does not require as much time or data collection as model-based tuning. Auditing may be performed on a more frequent basis than reconciliation. Auditing simply verifies that the module is performing within some limits. If it is outside the specified limits for some reason, then a reconciliation operation may be performed. If the module is far outside the specified limits, it may be necessary to perform model-based tuning. Also, if there is significant change to the module, such as replacement of hardware, model-based tuning may need to be repeated.

While the above is a full description of the specific embodiments, various modifications, alternative constructions and equivalents may be used. Therefore, the above description and illustrations should not be taken as limiting the scope of the present invention which is defined by the claims.

The invention claimed is:

1. A method of characterizing a process module having a plurality of process inputs that affect a process condition and a first plurality of sensors of the process condition whose outputs are used by a controller of the plurality of process inputs to maintain a desired process condition, using a process condition measuring device having a plurality of sensors that measure the process condition, comprising:

placing the process condition measuring device in the process module;

providing a first excitation to at least a first of the plurality of process inputs and providing a second excitation to at least a second of the plurality of process inputs, while recording the outputs of the second plurality of sensors; and using the recorded output of the plurality of sensors to develop a model of relationships between the process condition and the plurality of process inputs, including a first relationship between the process condition at a first of the second plurality of sensors and the first process input and a second relationship between the process condition at the first of the second plurality of sensors and the second process input, wherein the first plurality of sensors are part of the process module and wherein the process condition measuring device and the second plurality of sensors are separate from and removable from the process module.

2. The method of claim 1 wherein the process module is a multi-zone hot-plate having at least a first zone and a second zone, the first process input is a heat input of the first zone, the second process input is a heat input of the second zone and the process condition is temperature.

3. The method of claim 2 wherein the plurality of process inputs are heat inputs to a plurality of zones of the multi-zone hot-plate and the model provides a relationship between each heat input and the temperature measurement at each of the second plurality of sensors.

4. The method of claim 3 wherein the plurality of sensors may be selected from among a number of the second plurality of sensors of the PCMD and wherein data from unselected ones of the second plurality of sensors is not used in developing the model.

5. The method of claim 4 wherein data from unselected sensors is used to derive an intermediate model, the intermediate model being subsequently modified to eliminate dependence on data from the unselected sensors in the model.

6. The method of claim 5 wherein the intermediate model is a gain matrix and the model is a gain matrix that has fewer components than the intermediate model.

7. The method of claim 2 wherein the first excitation of the first process input is an increase in heat input to the first zone, the second excitation of the second process input is an increase in heat input to the second zone.

8. The method of claim 1 wherein the plurality of process inputs are controlled so that a process input is modified in response to a change in an output of one of the first plurality of sensors.

9. The method of claim 8 further comprising recording the plurality of process inputs and recording the outputs of the first plurality of sensors and using the recorded process inputs and the recorded outputs of the first plurality of sensors to develop the model.

10. The method of claim 8 wherein the controller includes a feedback controller according to a plurality of parameters, further comprising using the model to obtain a value for a controller parameter.

11. The method of claim 1 wherein the model of relationships between the process condition and the plurality of process inputs includes a dynamic relationship between at least one process input and the process condition at at least one of the second plurality of sensors.

12. The method of claim 1 further comprising using the model to determine process input values of the plurality of process inputs needed to produce a desired plurality of process condition values in the process module.

13. An apparatus for characterizing a process module that has first plurality of sensors that measure the process condition at a plurality of locations within the process module to control a plurality of process inputs that affect a process condition of the process module, comprising:
    a process condition measuring device having a plurality of sensors that measure the process condition at a plurality of locations when placed in the process module; and
    a modeling unit that receives process condition data from the first and second plurality of sensors and generates a model of a set of relationships between the plurality of controlled process inputs and the process condition at the plurality of sensors including a first relationship between a first process input and the process condition at one of the second plurality of sensors and a second relationship between a second process input and the process condition at the one sensor,
wherein the first plurality of sensors are part of the process module and wherein the process condition measuring device and the second plurality of sensors are separate from and removable from the process module.

14. The apparatus of claim 13 wherein the process condition measuring device comprises:
    a substrate;
    the second plurality of sensors that measure the process condition, the sensors attached to the substrate; and
    a memory that records the output of the second plurality of sensors.

15. The apparatus of claim 13 wherein a controlled input is controlled in response to a signal, the modeling unit receiving the controlled input and the signal.

16. A method of determining an operating parameter value for a controller of a hotplate having a plurality of heating zones, individual heating zones having a heating element that outputs power and a hot-plate-temperature sensor that measures a heating zone temperature, the output power of the heating elements being determined by the controller in response to the heating zone temperatures measured by the hot-plate temperature sensors according to a plurality of operating parameters, using a process condition measuring device that has a plurality of wafer-temperature sensors, wherein the hot-plate temperature sensors are part of the hot-plate and wherein the process condition measuring device and the wafer temperature sensors are separate from and removable from the hot-plate, comprising:
    placing the process condition measuring device on the hot-plate such that a first wafer-temperature sensor of the plurality of wafer-temperature sensors is proximate to a first heating zone, wherein the characteristics of the process condition measuring device include thermal characteristics that resemble those an article to be heated by the hotplate so that any temperatures measured by the plurality of device sensors when the process condition measuring device is subjected to heat input from the heating elements are similar to those that would exist when the article is subjected to the same heat input from the heating elements;
    powering the heating elements of the plurality of heating zones while recording the temperatures of the plurality of wafer-temperature sensors and the plurality of hot-plate temperature sensors;
    using the recorded temperatures of the plurality of wafer-temperature sensors and the plurality of hot-plate temperature sensors to develop a model of the temperatures of the plurality of wafer-temperature sensors and the heating zone temperatures of the plurality of heating zones including the relationship between the temperature of the first wafer-temperature sensor and the heating zone temperature of a second heating zone; and
    deriving a value of at least one of the operating parameter value for the controller from the model.

17. The method of claim 16 wherein the at least one of the plurality of operating parameters includes at least one of: a temperature setpoint, a temperature setpoint offset, a maximum power value, a minimum power value or a PID constant of a PID controller.

18. The method of claim 16 wherein the at least one operating parameter value that is determined is a temperature setpoint or a constant of a feedback controller.

19. The method of claim 16 further comprising recording the power outputs of the plurality of heating zones while recording the temperatures of the plurality of wafer-temperature sensors.

20. The method of claim 16 further comprising configuring the controller to operate according to the derived at least one operating parameter value and subsequently, with the process condition measuring device on the hot-plate, powering the heating elements of the plurality of heating zones to achieve desired temperatures while recording the temperatures of the plurality of wafer-temperature sensors and deriving at least a second operating parameter value for the controller from differences between the recorded temperatures and the desired temperatures.

21. A method of calibrating an article processing module having a plurality of processing zones that individually have their own input that affects a value of a processing condition therein and a module sensor measuring the processing condition therein, wherein the processing conditions of the individual zones are coupled with one another, and a controller that operates to receive the module sensor measurements and calculate therefrom the individual process zone inputs to maintain defined values of the processing conditions in the individual zones of the module, comprising:

positioning within the processing module a process condition measuring device having characteristics comparable to those of the article and with a plurality of device sensors of the processing condition distributed thereon, the measuring device being positioned in the module with the plurality of device sensors distributed across the plurality of zones, wherein the characteristics of the process condition measuring device are selected such that when the measuring device is subjected to process inputs from the individual zones of the module the processing conditions measured by the plurality of device sensors are similar to processing conditions that would exist when the article is subjected to the same process inputs from the same individual process zones,     varying the processing inputs of the plurality of zones over a period of time and measuring the processing conditions therein by both module sensor measurements and outputs of the device sensors over that period of time,     developing a model of relationships between the processing inputs and the measurements of the module sensors and the outputs of the device sensors,     determining from the model a set of calibration values for the module sensors,     removing the measuring device from the processing module and placing the article to be processed therein, and     adjusting the operation of the process module controller while processing the article to calculate values of the individual process zone inputs with use of the calibration values.

22. The method of claim 21, wherein the set of calibration values determined from the model include offsets of the module sensor measurements, and     adjusting the operation of the process module controller includes use of the offset values of the module sensor measurements.

23. The method of claim 22, wherein the process module includes a hot-plate, the processing condition includes temperature and the inputs to the processing zones are applied to individual heaters of the processing zones and the characteristics of the process condition measuring device include thermal characteristics that resemble those the article so that any temperatures measured by the plurality of device sensors when the process condition measuring device is subjected to heat input from the individual heaters are similar to those that would exist when the article is subjected to the same heat input from the individual heaters.

24. The method of claim 22, wherein the article being processed includes a substrate from which either an integrated circuit or flat panel display is being formed.

25. The method of claim 21, wherein the article includes a substrate and the processing module operates to perform one or more of a group of processes that comprises etching the substrate, depositing layers on the substrate, adding dopants to the substrate and forming patterns on the substrate.

* * * * *